UNITED STATES PATENT OFFICE.

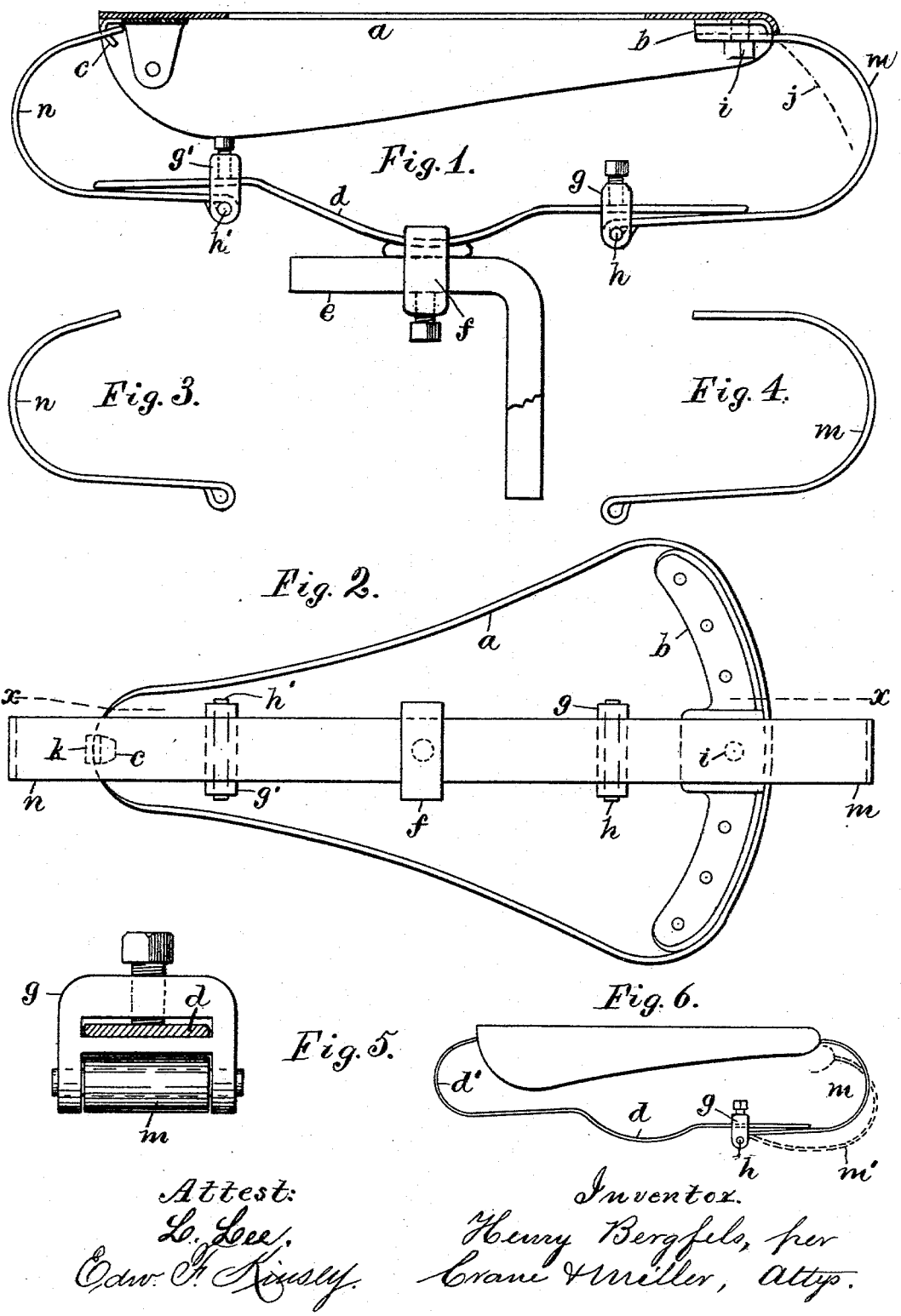

HENRY BERGFELS, OF NEWARK, NEW JERSEY.

BICYCLE-SEAT SPRING.

SPECIFICATION forming part of Letters Patent No. 490,097, dated January 17, 1893.

Application filed July 27, 1892. Serial No. 441,358. (No model.)

*To all whom it may concern:*

Be it known that I, HENRY BERGFELS, a citizen of the United States, residing at Newark, Essex county, New Jersey, have invented certain new and useful Improvements in Bicycle-Seat Springs, fully described and represented in the following specification and the accompanying drawings, forming a part of the same.

This invention consists in the combination with a spring bar fixed upon the bicycle seat post, with a connection to the forward end of the seat leather, of a U-shaped leaf spring attached rigidly to the rear of the cantle, and the other end hinged to the rear part of the fixed spring bar. The hinge is attached to the fixed spring bar by an adjustable clamp, and is set forward from the rear end of the seat leather a suitable distance to strain the leather backward as it is pressed downward by the load. The load upon the seat tends naturally to pull the upper end of the U-spring forward, and it is resisted by a suitable stop which obstructs such upward movement. The fixed spring bar may be connected to the front end of the seat leather by a hinged spring similar to the U-spring at the rear, or it may be attached thereto by a U-spring formed upon the front end of the fixed spring bar.

The invention is illustrated in the annexed drawings in which

Figure 1 is a side elevation of a bicycle saddle with my improvements, the seat leather being shown in section on line $x, x$, in Fig. 2. Fig. 2 shows the under side or the saddle removed from the support. In Figs. 1 and 2 hinged springs are shown at both ends of the fixed spring, the hinged U-spring for the front of the seat leather being shown detached in Fig. 3, and the hinged U-spring for the cantle being shown detached in Fig. 4. Fig. 5 is a side view of the hinged clamp upon a larger scale with a section of the fixed leaf, and Fig. 6 is a side elevation upon a smaller scale than Fig. 1 of a bicycle saddle with the fixed spring connected directly to the forward end of the saddle by reflexed curve.

$a$ is the seat leather, $b$ the cantle secured in the rear end of the same, and $c$ a hook secured in the front end of the same.

$d$ is the fixed spring bar having a downward curve in the middle by which it is secured to the seat post $e$ by a suitable clamp $f$. The ends of the leaf bar are projected forward and backward from the curved portion, the front end being connected directly or indirectly with the hook $c$, and a pivot being clamped thereto within its rear end. The end of the leaf bar projecting beyond the pivot operates as a stop or check to the movement of the U-spring which is hinged upon the pivot. The clamp $g$ is provided with ears to sustain a pivot $h$ to which the lower end of the U-spring $m$ is shown attached; the other end of the spring $m$ being fixed rigidly to the cantle by bolts $i$, but may be secured thereto by rivets or other suitable means.

In Fig. 1, a U-shaped spring $n$ is shown attached to the front end of the spring bar $d$ by means of a clamp $g'$ and pivot $h'$. The upper end of the U-spring $n$ is formed with a slot or opening $k$ shown in dotted lines in Fig. 2 to engage with the hook $c$ at the front end of the seat leather $a$. With this construction the front and the rear of the seat leather are connected to the spring bar $d$ by the hinge-pins $h$, and $h'$, but in Fig. 6 the front end of the leaf spring is shown with a reflex curve $d'$ which may be engaged with the hook $c$ like the U-spring $n$.

The under part of the U-spring at the front or rear end of the seat is held from upward movement by a suitable stop. In Fig. 1 such stop is shown furnished by the extension of the leaf $d$ beyond the clamp $g$ or $g'$. Such extension lies over the under member of the U-spring and holds the same normally in the position shown in Fig. 1; while the load upon the seat tends to bend the curve of the U-spring, and to turn its lower member downward around the hinge-pin, as indicated by the dotted lines $m'$ in Fig. 6. The initial tension of the seat leather is secured by a proper adjustment of the clamp $g$ or $g'$ upon the leaf $d$, and such tension may be restored or adjusted at any time to suit the weight of the rider. The rear end of the seat leather supports in practice the greater part of the load, and such load is sustained with peculiar elasticity upon the hinge pin $h$ by the yielding of the U-spring $m$, the lower member of which is strained throughout its entire length by its pivotal connection with its fixed leaf $d$.

The leaf spring $n$ shown at the front of the seat in Fig. 1 performs a similar function, but yields more freely) as is desirable to compensate for the lighter load thereon) by its loose connection with the hook $c$. As the rear of the seat supports the greater part of the load, the hinged U-spring may wihout disadvantage be in most cases applied to the rear of the seat, as shown in Fig. 6; the curved end $d'$ upon the fixed leaf imparting sufficient elasticity to the front end of the seat. The fixed leaf $d$ yields in some measure adjacent to the clamp $f$, and thus contributes to the yielding character of the seat; but it operates to hold the pivot $h$ in substantially the same relation to the post $e$, so that the rear of the seat leather is carried in an arc around such pivot when depressed, as indicated by the dotted curve $j$ in Fig. 1 drawn concentric with such pivot, and the depression of the seat at the rear end thus serves to stretch the seat leather in the desired manner to maintain its tension and prevent it from buckling or collapsing under the load. If the pivot $h$ were moved forward a considerable distance, the arc $j$ would be chiefly at right angles with the seat and the U-spring $m$ would offer no resistance to the load; while the movement of the pivot $h$ backward in an excessive degree would make the spring yield in a vertical direction only, and would not increase the tension of the leather as the load was increased. The operation of the rear spring $m$ is thus dependent upon the pivot $h$ being suitably adjusted in advance of the cantle $b$, or that point upon the cantle to which the upper end of the spring is secured.

As the hinged U-spring is of a special advantage in its combination with the rear of the seat, and operates with equal efficiency independently of the forward connection, I have made a separate claim to such a combination.

The invention is shown in the drawings embodied in a combination of flat or leaf springs; but it is obvious that the form of cross section of the springs is immaterial to the invention, and that elastic bars of any well known form of cross section may be employed without departing from the invention.

Having thus set forth the nature of my invention what I claim is:

1. In a bicycle saddle, the combination, with the seat leather $a$ having the cantle $b$, of a spring bar $d$ connected to the front of the seat leather, a clamp $f$ for securing the same upon a post, and a U-spring secured at its upper end to the cantle and attached at its lower end to the spring bar $d$ by a pivotal connection in the rear of the clamp $f$, substantially as set forth.

2. In a bicycle saddle, the combination, with the seat leather $a$ having a cantle $b$, of a spring bar $d$ attached to the front of the seat leather, a clamp for securing the same upon a seat post, a pivot $h$ affixed to the spring bar $d$ within its rear end and adjustable to and from the clamp, and the U-spring $m$ secured at its upper end to the cantle and hinged at its lower end beneath the spring bar $d$ to the pivot $h$, substantially as herein set forth.

3. In a bicycle saddle, the combination, with the seat $a$ having cantle $b$ and hook $c$, of the spring bar $d$ curved downward at its middle, the clamps $g$, $g'$, provided with the pivots $h$, $h'$, and secured upon the spring bar inside its ends, and the U-springs $m$ and $n$ connecting the pivots respectively with the cantle and the hook, as set forth.

In testimony whereof I have hereunto set my hand in the presence of two subscribing witnesses.

HENRY BERGFELS.

Witnesses:
EDWARD F. KINSEY,
HENRY J. MILLER.